(12) United States Patent
Moyer et al.

(10) Patent No.: US 11,106,594 B2
(45) Date of Patent: Aug. 31, 2021

(54) QUALITY OF SERVICE DIRTY LINE TRACKING

(71) Applicant: Advanced Micro Devices, Inc., Santa Clara, CA (US)

(72) Inventors: Paul James Moyer, Fort Collins, CO (US); Douglas Benson Hunt, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/562,128

(22) Filed: Sep. 5, 2019

(65) Prior Publication Data

US 2021/0073137 A1    Mar. 11, 2021

(51) Int. Cl.
*G06F 12/0891* (2016.01)
*G06F 9/30* (2018.01)
*G06F 9/38* (2018.01)
*G06F 12/0811* (2016.01)

(52) U.S. Cl.
CPC ........ *G06F 12/0891* (2013.01); *G06F 9/3009* (2013.01); *G06F 9/3816* (2013.01); *G06F 12/0811* (2013.01)

(58) Field of Classification Search
CPC ............. G06F 12/0891; G06F 12/0811; G06F 9/3009; G06F 9/3816
See application file for complete search history.

(56) References Cited

U.S. PATENT DOCUMENTS

| 5,542,062 A | 7/1996 | Taylor et al. |
| 5,692,150 A | 11/1997 | Moriyama |
| 6,205,521 B1 | 3/2001 | Schumann |
| 8,285,936 B2 | 10/2012 | Roberts et al. |

(Continued)

FOREIGN PATENT DOCUMENTS

WO    2006/102665    9/2006

OTHER PUBLICATIONS

International Search Report and Written Opinion from PCT/US2013/046048, dated Sep. 26, 2013, Advanced Micro Devices, pp. 1-10.

(Continued)

*Primary Examiner* — Sean D Rossiter
(74) *Attorney, Agent, or Firm* — Rory D. Rankin; Kowert, Hood, Munyon, Rankin & Goetzel, P.C.

(57) ABSTRACT

Systems, apparatuses, and methods for generating a measurement of write memory bandwidth are disclosed. A control unit monitors writes to a cache hierarchy. If a write to a cache line is a first time that the cache line is being modified since entering the cache hierarchy, then the control unit increments a write memory bandwidth counter. Otherwise, if the write is to a cache line that has already been modified since entering the cache hierarchy, then the write memory bandwidth counter is not incremented. The first write to a cache line is a proxy for write memory bandwidth since this will eventually cause a write to memory. The control unit uses the value of the write memory bandwidth counter to generate a measurement of the write memory bandwidth. Also, the control unit can maintain multiple counters for different thread classes to calculate the write memory bandwidth per thread class.

20 Claims, 7 Drawing Sheets

(56) References Cited

U.S. PATENT DOCUMENTS

| | | |
|---|---|---|
| 8,285,940 B2 | 10/2012 | Reid |
| 8,291,168 B2 | 10/2012 | Wilkerson et al. |
| 9,251,081 B2 | 2/2016 | Chang et al. |
| 2002/0078268 A1 | 6/2002 | Lasserre |
| 2006/0143397 A1 | 6/2006 | O'Bleness et al. |
| 2012/0124294 A1 | 5/2012 | Atkisson et al. |
| 2012/0124543 A1 | 5/2012 | Gunasekar |
| 2013/0346683 A1 | 12/2013 | Walker |
| 2018/0203799 A1 | 7/2018 | Gaur et al. |
| 2019/0095330 A1* | 3/2019 | Roberts ............... G06F 12/0804 |
| 2019/0340140 A1* | 11/2019 | Sozzi ................. G06F 13/1663 |

OTHER PUBLICATIONS

International Search Report and Written Opinion from PCT/US2020/049215, dated Jan. 12, 2021, Advanced Micro Devices, 1-12 pages.
Rafier et al., "Bandwidth Measurement using Performance Counters for Predictable Multicore Software", Proceedings of 2012 IEEE 17th International Conference on Emerging Technologies & Factory Automation (ETFA 2012), Krakow, Poland, Sep. 17-21, 2012, IEEE, Piscataway, New Jersey, Sep. 17, 2012, pp. 1-4, XP032350253.

\* cited by examiner

QUALITY OF SERVICE DIRTY LINE TRACKING

BACKGROUND

Description of the Related Art

Most modern computing devices provide at least one level of cache memory (or cache) in addition to a main memory in the computing device. Generally, caches are smaller-capacity, faster-access memories that are used for storing a limited number of copies of data and instructions to be used for performing various operations nearer to the functional blocks in the computing device that perform the operations. Caches are typically implemented using higher-speed memory circuits, such as static random access memory (SRAM) integrated circuits or other types of memory circuits. When a processor requests access to data stored in memory, the processor first determines whether a copy of the data is stored in the cache. If so, the processor accesses the cache, facilitating a more efficient accessing of the data.

In some caches, the class or thread associated with a cache line is stored in the cache. This leads to additional information being stored in the cache which can consume a large amount of area. Additionally, in schemes where an indication of the thread class is stored in the cache, software can periodically change the class of a thread. When this happens, the thread class information in the cache lines in a potentially large level three (L3) cache might be stale.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for measuring write memory bandwidth are disclosed herein. In one implementation, a system includes a processor, a cache hierarchy, and a memory subsystem. The cache hierarchy includes one or more cache levels and one or more cache controllers (i.e., control units). In one implementation, a given control unit monitors writes to the cache hierarchy. If a write to a cache line is a first time that the cache line is being modified since entering the cache hierarchy, then the control unit increments a write memory bandwidth counter. Otherwise, if the write is to a cache line that has already been modified since entering the cache hierarchy, then the control unit does not increment the write memory bandwidth counter. The first write to a cache line is a proxy for write memory bandwidth since this will eventually cause a write to memory. The control unit uses the value of the write memory bandwidth counter to generate a measurement of the write memory bandwidth. Also, the control unit can maintain multiple counters for different thread classes to calculate the write memory bandwidth per thread class.

Figure 1:
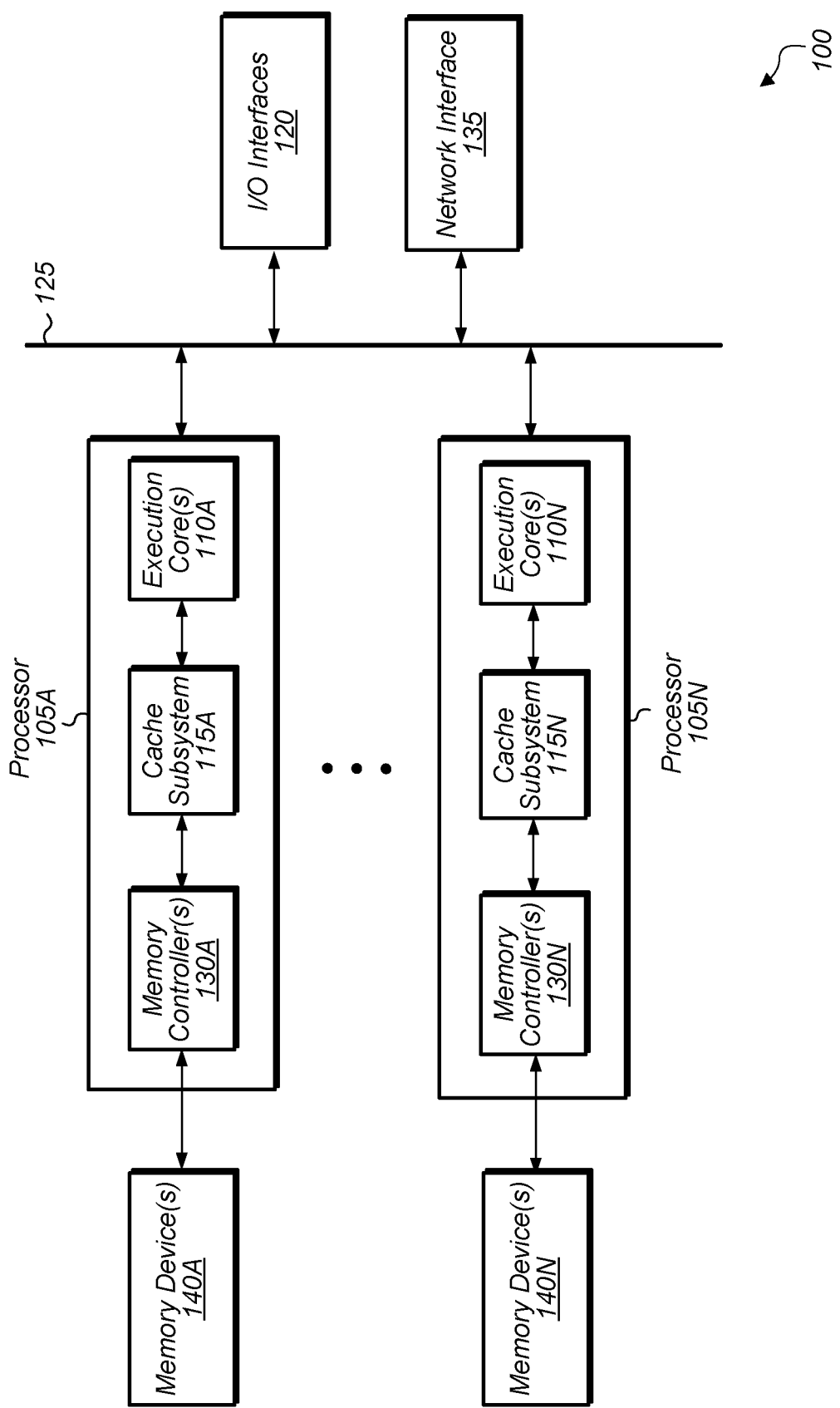
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130A-N, network interface 135, and memory device(s) 140A-N. In other implementations, computing system 100 includes other components (e.g., display controller) and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In one implementation, processor 105A includes at least execution core(s) 110A, cache subsystem 115A, and memory controller(s) 130A. Similarly, processor 105N includes at least execution core(s) 110N, cache subsystem 115N, and memory controller(s) 130N. It is noted that execution core(s) 110A-N can also be referred to herein as execution units. It is also noted that processors 105A-N can include other components which are not shown to avoid obscuring the figure.

For system 100, there may be a desire to measure memory bandwidth for a given process or class of processes, for informational purposes to software, for bandwidth enforcement via quality of service (QOS) schemes, or for other hardware which is interested in how much memory bandwidth is being used. Existing solutions measure read memory bandwidth in a relatively straightforward manner, as cache miss requests often have a global requester ID or other indication of class attached to the request. Measuring write memory bandwidth is less straightforward since writes can be the result of a cache eviction, and the cache might not store an indication of the class to which a cache line belongs. Accordingly, in various implementations, system 100 uses various techniques for measuting, in an efficient manner, the write memory bandwidth to memory devices 140A-N.

In one implementation, cache subsystems 115A-N include control logic for monitoring the first time that a cache line is written to by execution core(s) 110A-N, respectively, after being brought into cache subsystems 115A-N. In one implementation, the control logic increments a counter anytime a cache line is modified for the first time since being cached at any level in a corresponding cache subsystem 115A-N. If a cache line is being modified for a second or subsequent time, then the control logic does not increment the counter. The control logic generates a measurement of write memory bandwidth based on a value of the counter. In one implementation, the control logic monitors the first time writes to cache lines on a per thread class basis. In this implementation, the control logic generates a per-thread-class measurement of write memory bandwidth.

Memory controller(s) 130A-N are representative of any number and type of memory controllers which are coupled to any number and type of memory devices(s) 140A-N, respectively. While memory controller(s) 130A-N are shown as being located within processors 105A-N, respectively, this is merely indicative of one implementation. In another implementation, memory controller(s) 130A-N are external to processors 105A-N, respectively. It is also noted that a portion of cache subsystems 115A-N can be located within execution core(s) 110A-N, respectively, and another portion of cache subsystems 115A-N can be located external to execution core(s) 110A-N. For example, in one implementation, a level one (L1) cache and a level two (L2) cache are located within execution core(s) 110A-N while a last level cache (LLC) is located external to execution core(s) 110A-N.

Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, network interface cards, keyboards, mice, printers, scanners, joysticks or other types of game controllers, media recording devices, external storage devices, and so forth. Network interface 135 is used to receive and send messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, there can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
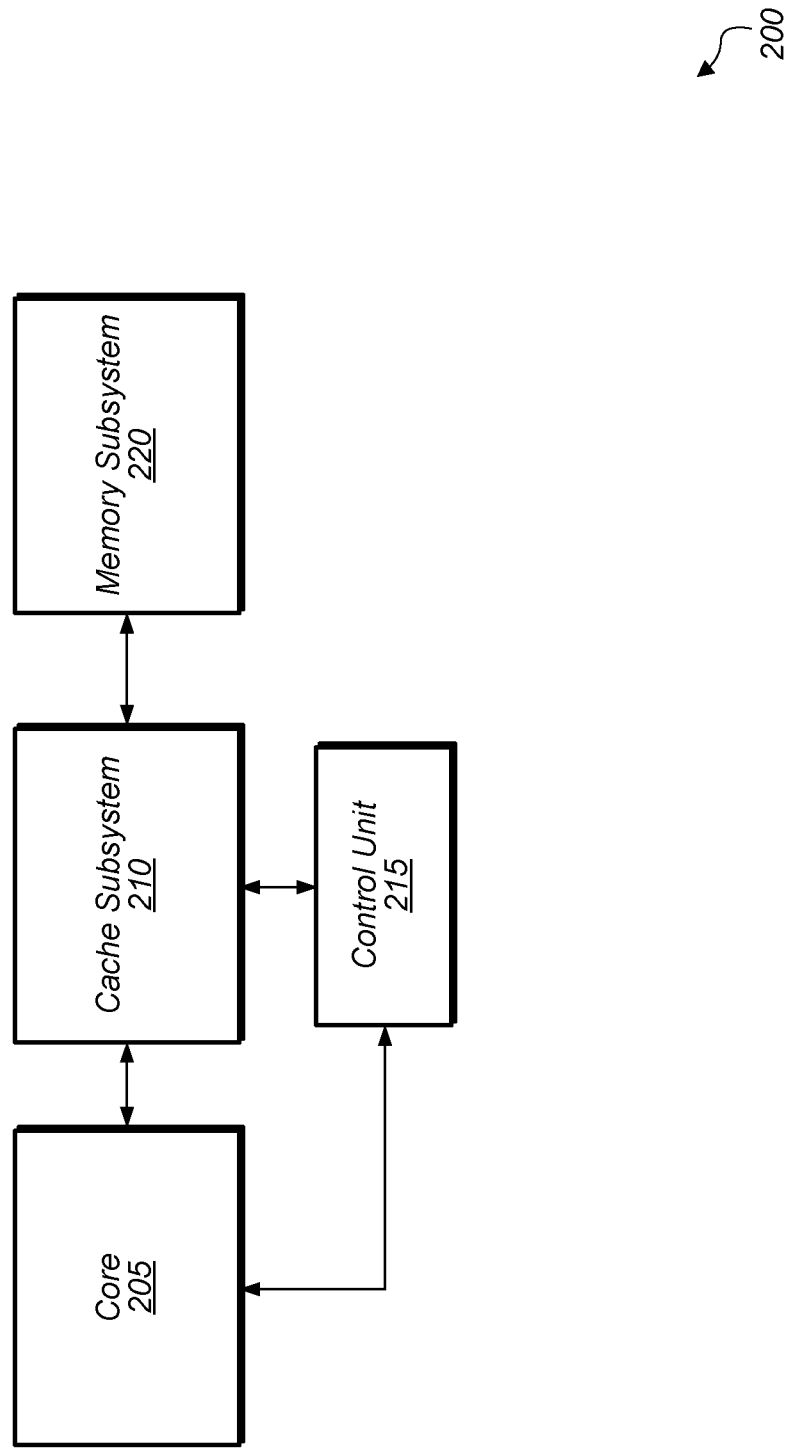
FIG. 2 is a block diagram of one implementation of a processor.

Turning now to FIG. 2, a block diagram of one implementation of a processor 200 is shown. In one implementation, processor 200 includes at least execution core 205, cache subsystem 210, control unit 215, and memory subsystem 220. It is noted that processor 200 can also include other components which are not shown to avoid obscuring the figure. Core 205 is representative of any number of processor cores for executing instructions of one or more programs and/or an operating system. In one implementation, the circuitry of processor 200 is included in processor 105A and/or processor 105N (of FIG. 1).

In one implementation, core 205 sends read and write requests to cache subsystem 210. Control unit 215 monitors the writes that are performed to cache lines of cache subsystem 210 and maintains counters to track the first time cache lines are written to for the different thread classes of processor 200. Each time a cache line is written to for the first time since being brought into cache subsystem 210, control unit 215 increments a counter for a corresponding thread class of the cache line. Each counter is used for generating an estimate of the write memory bandwidth for the corresponding thread cache.

Figure 3:
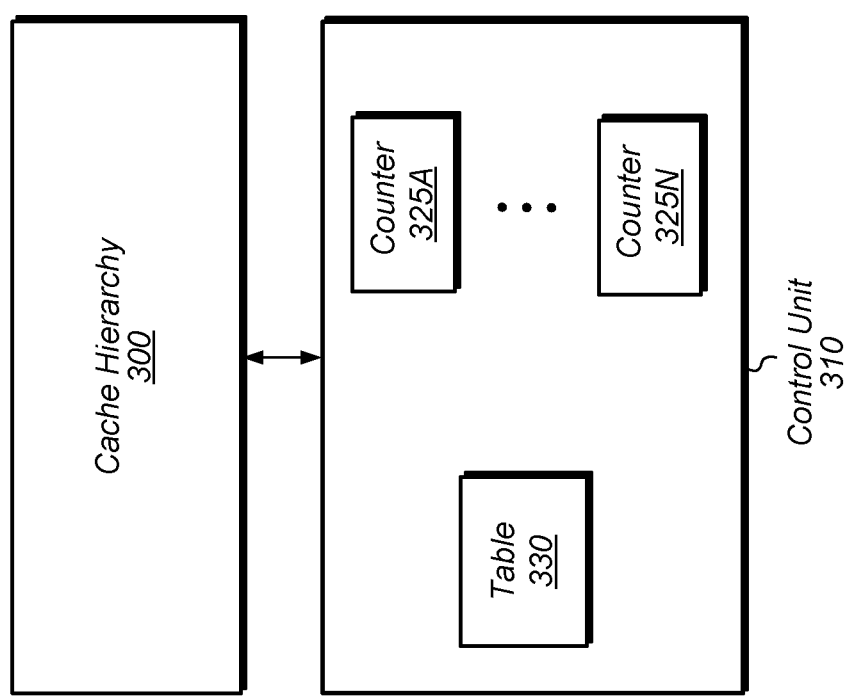
FIG. 3 is a block diagram of one implementation of calculating write memory bandwidth for a cache hierarchy.

Referring now to FIG. 3, a block diagram of one implementation of calculating write memory bandwidth for a cache hierarchy 300 is shown. Cache hierarchy 300 includes any number of cache levels, with the number of levels varying according to the implementation. In one implementation, cache hierarchy 300 is representative of cache subsystem 210 of FIG. 2. Control unit 310 monitors the writes that are performed to cache lines of cache hierarchy 300. In one implementation, control unit 310 includes a separate counter 325A-N for each separate thread class of the host computing system. When a write is performed to a given cache line for the first time since the given cache line entered cache hierarchy 300, control unit 310 determines the thread class of the write operation. In one implementation, control unit 310 receives an indication of the thread class from the execution unit. In another implementation, control unit 310 performs a lookup to table 330 with an address of the given cache line to find the thread class that corresponds to the address. In a further implementation, control unit 310 queries a load/store unit (not shown) of the execution unit to determine the thread class of the write operation. In other implementations, control unit 310 uses other techniques to determine the thread class of the write operation.

Each counter 325A-N is indicative of the write memory bandwidth for the corresponding thread class. In one implementation, if the value of a given counter 325A-N is greater than a programmable threshold, then memory traffic of the corresponding thread class is reduced until the value of the given counter 325A-N falls below the programmable threshold. In various implementations, memory traffic of the corresponding thread class is reduced by queuing write requests at the memory controller, by reducing the priority of write requests of the corresponding thread class, or by using other techniques. For example, other mechanisms for reducing the memory traffic of the corresponding thread class include reducing the number of outstanding allowable memory requests from that thread class at the execution core, reducing the execution rate of those thread classes down to a level which reaches the desired memory traffic rate, or otherwise.

Figure 4:
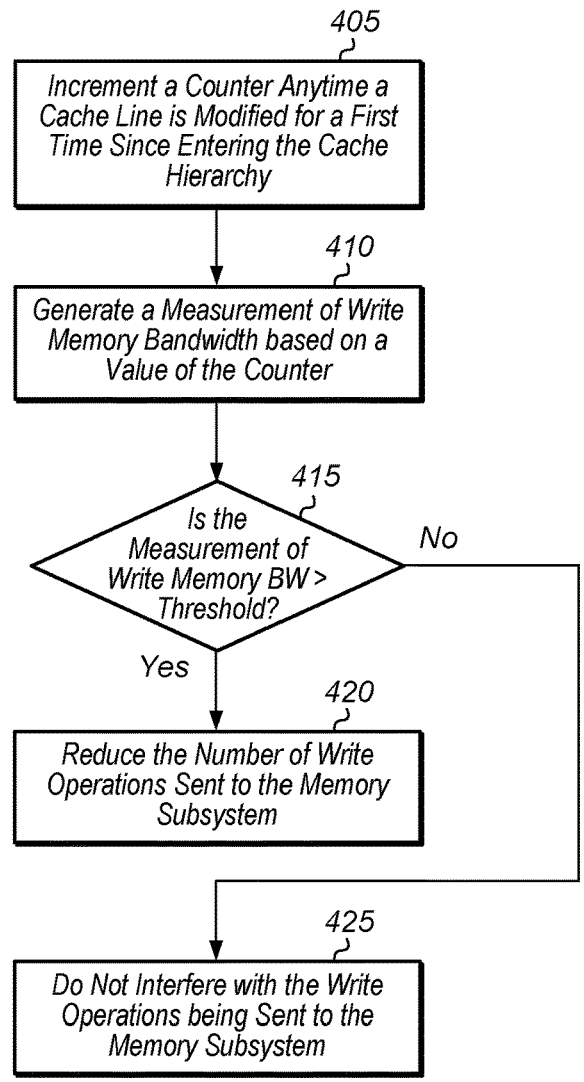
FIG. 4 is a generalized flow diagram illustrating one implementation of a method for generating a measurement of write memory bandwidth.
Figure 5:
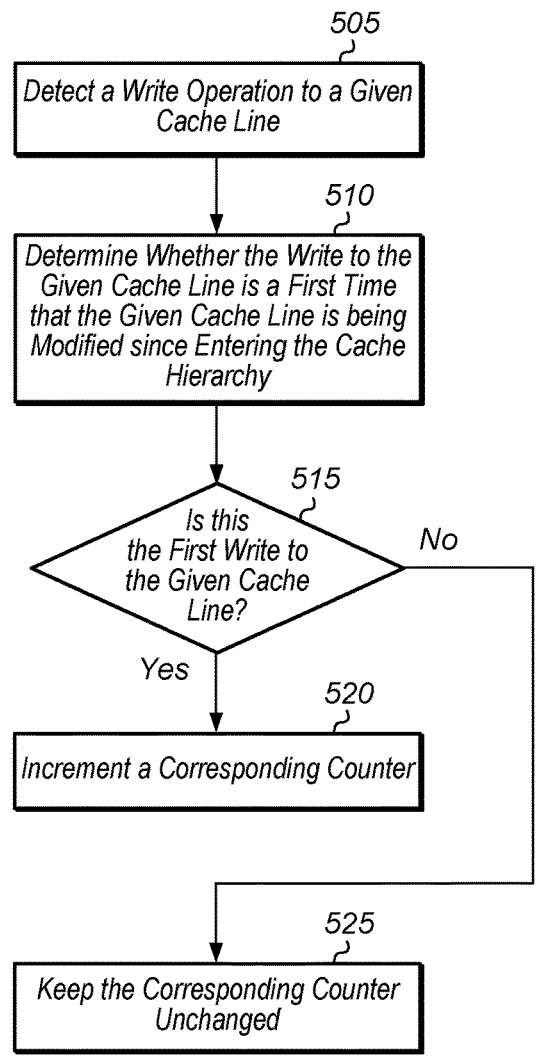
FIG. 5 is a generalized flow diagram illustrating one implementation of a method for monitoring writes to a cache.
Figure 6:
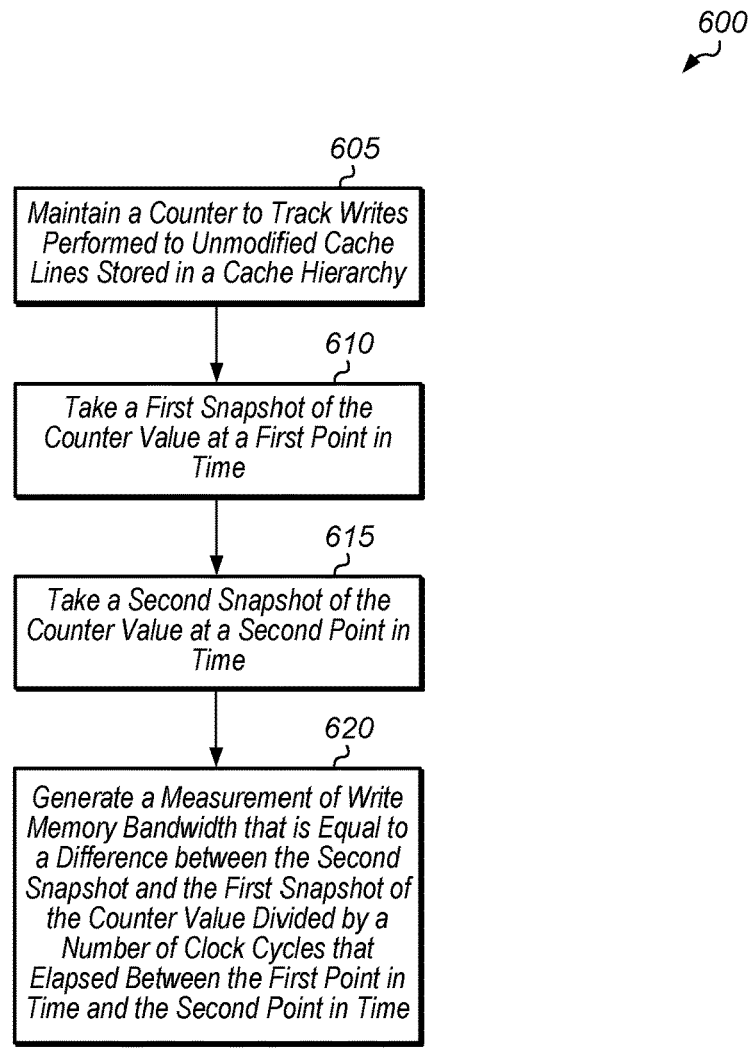
FIG. 6 is a generalized flow diagram illustrating one implementation of a method for generating a measurement of write memory bandwidth.
Figure 7:
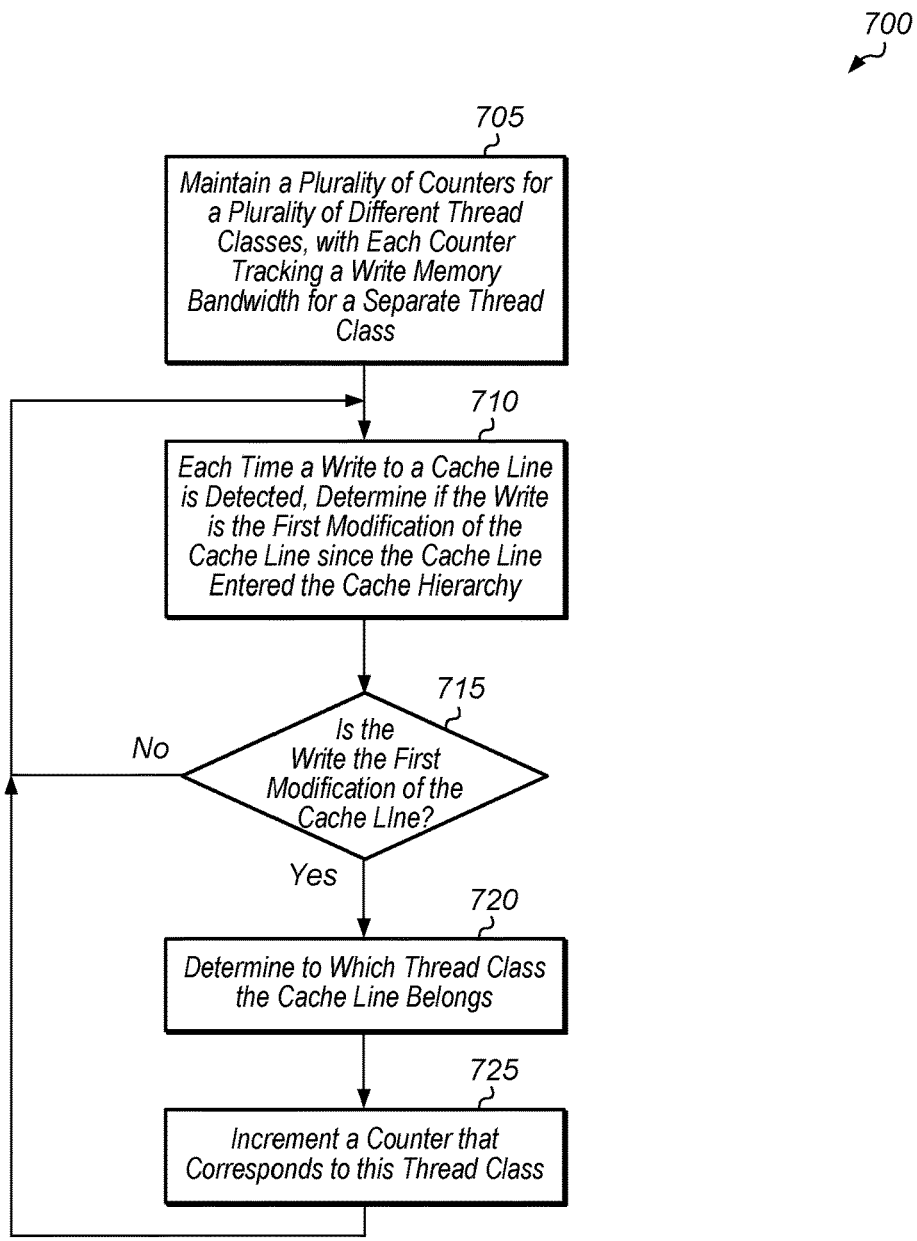
FIG. 7 is a generalized flow diagram illustrating one implementation of a method for tracking write memory bandwidth per thread class.

Turning now to FIG. 4, one implementation of a method 400 for generating a measurement of write memory bandwidth is shown. For purposes of discussion, the steps in this implementation and those of FIGS. 5-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A control unit increments a counter anytime a cache line is modified for a first time since entering the cache hierarchy (block 405). The control unit generates a measurement of write memory bandwidth based on a value of the counter (block 410). One example of generating the measurement of write memory bandwidth is described in method 600 (of FIG. 6). If the measurement of write memory bandwidth is greater than a given threshold (conditional block 415, "yes" leg), then the control unit reduces the number of write operations sent to the memory subsystem (block 420). Otherwise, if the measurement of write memory bandwidth is less than or equal to the given threshold (conditional block 415, "no" leg), then the control unit does not interfere with the write operations being sent to the memory subsystem (block 425). After blocks 420 and 425, method 400 returns to block 405. In another implementation, the control unit generates a measurement of the total memory bandwidth by adding the measurement of write memory bandwidth generated in block 410 to a measurement of read memory bandwidth. Then, in this implementation, the control unit determines if the total memory bandwidth is greater than the given threshold in conditional block 415.

Referring now to FIG. 5, one implementation of a method 500 for monitoring writes to a cache is shown. A write operation to a given cache line is detected (block 505). In response to detecting the write operation, a control unit determines whether the write to the given cache line is a first time that the given cache line is being modified since entering the cache hierarchy (block 510). In one implementation, the dirty status of the given cache line is checked to determine if the given cache line has previously been written to since entering the cache hierarchy.

If the write to the given cache line is the first time the given cache line is being modified since the given cache line entered the cache hierarchy (conditional block 515, "yes" leg), then the control unit increments a corresponding counter (block 520). Otherwise, if the given cache line has previously been modified since entering the cache hierarchy (conditional block 515, "no" leg), then the control unit keeps the corresponding counter unchanged (block 525). After blocks 520 and 525, method 500 ends.

Turning now to FIG. 6, one implementation of a method 600 for generating a measurement of write memory bandwidth is shown. A control unit maintains a counter to track writes performed to unmodified cache lines stored in a cache hierarchy (block 605). It is noted that writes performed to modified cache lines are not tracked by the counter. The control unit takes a first snapshot of the counter value at a first point in time (block 610). Alternatively, in another implementation, the control unit resets the counter at the start of method 600, in which case block 610 can be skipped since the counter will have a value of zero at the first point in time.

Later, after some period of time has elapsed, the control unit takes a second snapshot of the counter value at a second point in time (block 615). The amount of time that is allowed to elapse between the first and second points in time can be programmable or some predetermined amount of time. Next, the control unit generates a measurement of write memory bandwidth that is equal to a difference between the second snapshot and the first snapshot of the counter value divided by a number of clock cycles that elapsed between the first point in time and the second point in time (block 620). After block 620, method 600 ends. It is noted that the measurement of write memory bandwidth generated in block 620 can be used by software and/or hardware in a variety of ways. It is also noted that method 600 can be executed on a periodic basis. In some cases, the control unit resets the counter after each iteration of method 600.

Referring now to FIG. 7, one implementation of a method 700 for tracking write memory bandwidth per thread class is shown. A control unit maintains a plurality of counters for a plurality of different thread classes, with each counter tracking a write memory bandwidth for a separate thread class (block 705). Each time a write to a cache line is detected, the control unit determines if this write is the first modification of the cache line since the cache line entered the cache hierarchy (block 710). For example, in one implementation, a write to a cache line that does not have a corresponding dirty bit set is considered a first modification of the cache line.

If the write is the first modification of the cache line since the cache line entered the cache hierarchy (conditional block 715, "yes" leg), then the control unit determines to which thread class the cache line belongs (block 720). In one implementation, the control unit retrieves the thread class from a load/store unit entry corresponding to the instruction which caused the write to the cache line. In another implementation, the control unit retrieves the thread class from a reorder buffer entry corresponding to the instruction which caused the write to the cache line. In a further implementation, the control unit performs a lookup of a thread class table using an address of the cache line to determine the thread class that corresponds to the address. If the write is not the first modification of the cache line since the cache line entered the cache hierarchy (conditional block 715, "no" leg), then method 700 returns to block 710. After determining to which thread class the cache line belongs, the control unit increments a counter that corresponds to this thread class (block 725). After block 725, method 700 returns to block 710.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a cache hierarchy; and
   a control unit configured to:

increment a counter only when a cache line is modified for a first time since the cache line entered the cache hierarchy;

generate a measurement of write memory bandwidth based on a value of the counter; and cause a number of write operations that are conveyed to a memory subsystem to be reduced responsive to the measurement of write memory bandwidth exceeding a given threshold.

2. The processor as recited in claim 1, wherein the control unit is further configured to:

detect a write operation targeting a first cache line; and increment the counter responsive to determining that the write operation to the first cache line is a first modification of the first cache line since the first cache line entered the cache hierarchy.

3. The processor as recited in claim 2, wherein the control unit is further configured to keep the counter unchanged responsive to determining that the write to the first cache line is not the first modification of the first cache line since the first cache line entered the cache hierarchy.

4. The processor as recited in claim 1, wherein the control unit is further configured to:

record a first value of the counter at a first point in time;

record a second value of the counter at a second point in time, wherein the second point in time is subsequent to the first point in time; and calculate the measurement of write memory bandwidth as being equal to a difference between the second value and the first value divided by a number of clock cycles that elapsed between the first point in time and the second point in time.

5. The processor as recited in claim 1, wherein the control unit is further configured to:

maintain a plurality of counters for a plurality of different thread classes, wherein each counter tracks a write memory bandwidth for a separate thread class;

detect a first write to a given cache line since the given cache line has entered the cache hierarchy; and increment a counter that corresponds to a thread class to which the given cache line belongs.

6. The processor as recited in claim 1, wherein the control logic is further configured to add the measurement of write memory bandwidth to a given measurement of read memory bandwidth to calculate a total memory bandwidth.

7. The processor as recited in claim 6, wherein the control logic is further configured to compare the total memory bandwidth to one or more thresholds.

8. A method comprising:

incrementing, by a control unit, a counter only when a cache line is modified for a first time since the cache line entered a cache hierarchy;

generating a measurement of write memory bandwidth based on a value of the counter; and causing a number of write operations that are conveyed to a memory subsystem to be reduced responsive to the measurement of write memory bandwidth exceeding a given threshold.

9. The method as recited in claim 8, further comprising:

detecting a write operation targeting a first cache line; and incrementing the counter responsive to determining that the write operation to the first cache line is a first modification of the first cache line since the first cache line entered the cache hierarchy.

10. The method as recited in claim 9, further comprising keeping the counter unchanged responsive to determining that the write to the first cache line is not the first modification of the first cache line since the first cache line entered the cache hierarchy.

11. The method as recited in claim 8, further comprising:

recording a first value of the counter at a first point in time;

recording a second value of the counter at a second point in time, wherein the second point in time is subsequent to the first point in time; and calculating the measurement of write memory bandwidth as being equal to a difference between the second value and the first value divided by a number of clock cycles that elapsed between the first point in time and the second point in time.

12. The method as recited in claim 8, further comprising:

maintaining a plurality of counters for a plurality of different thread classes, wherein each counter tracks a write memory bandwidth for a separate thread class;

detecting a first write to a given cache line since the given cache line has entered the cache hierarchy; and incrementing a counter that corresponds to a thread class to which the given cache line belongs.

13. The method as recited in claim 8, further comprising adding the measurement of write memory bandwidth to a given measurement of read memory bandwidth to calculate a total memory bandwidth.

14. The method as recited in claim 8, further comprising comparing the total memory bandwidth to one or more thresholds.

15. A system comprising:

a memory subsystem; and a processor coupled to the memory subsystem;

wherein the processor is configured to:

increment a counter only when a cache line is modified for a first time since the cache line entered a cache hierarchy;

generate a measurement of write memory bandwidth based on a value of the counter; and cause a number of write operations that are conveyed to a memory subsystem to be reduced responsive to the measurement of write memory bandwidth exceeding a given threshold.

16. The system as recited in claim 15, wherein the processor is further configured to:

detect a write operation targeting a first cache line; and increment the counter responsive to determining that the write operation to the first cache line is a first modification of the first cache line since the first cache line entered the cache hierarchy.

17. The system as recited in claim 16, wherein the processor is further configured to keep the counter unchanged responsive to determining that the write to the first cache line is not the first modification of the first cache line since the first cache line entered the cache hierarchy.

18. The system as recited in claim 15, wherein the processor is further configured to:

record a first value of the counter at a first point in time;

record a second value of the counter at a second point in time, wherein the second point in time is subsequent to the first point in time; and calculate the measurement of write memory bandwidth as being equal to a difference between the second value and the first value divided by a number of clock cycles that elapsed between the first point in time and the second point in time.

19. The system as recited in claim 15, wherein the processor is further configured to:

maintain a plurality of counters for a plurality of different thread classes, wherein each counter tracks a write memory bandwidth for a separate thread class;

detect a first write to a given cache line since the given cache line has entered the cache hierarchy; and increment a counter that corresponds to a thread class to which the given cache line belongs.

20. The system as recited in claim 15, wherein the control logic is further configured to add the measurement of write memory bandwidth to a given measurement of read memory bandwidth to calculate a total memory bandwidth.

\* \* \* \* \*